US009669923B2

(12) United States Patent
Goette et al.

(10) Patent No.: US 9,669,923 B2
(45) Date of Patent: Jun. 6, 2017

(54) ROTOR BLADE CONTROL DEVICE

(71) Applicant: ZF Friedrichshafen AG, Friedrichshafen (DE)

(72) Inventors: Juergen Goette, Vellmar (DE); Uwe Arnold, Kassel (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 383 days.

(21) Appl. No.: 14/385,087

(22) PCT Filed: Feb. 1, 2013

(86) PCT No.: PCT/EP2013/051997
§ 371 (c)(1),
(2) Date: Sep. 12, 2014

(87) PCT Pub. No.: WO2013/135431
PCT Pub. Date: Sep. 19, 2013

(65) Prior Publication Data
US 2015/0050148 A1 Feb. 19, 2015

(30) Foreign Application Priority Data
Mar. 14, 2012 (DE) .................. 10 2012 203 978

(51) Int. Cl.
*B64C 27/605* (2006.01)
*B64C 27/625* (2006.01)
(52) U.S. Cl.
CPC .......... *B64C 27/605* (2013.01); *B64C 27/625* (2013.01)
(58) Field of Classification Search
CPC ......... B64C 27/54; B64C 27/56; B64C 27/57; B64C 27/59; B64C 27/605; B64C 27/625; B64C 27/628; B64C 27/68
See application file for complete search history.

(56) References Cited

U.S. PATENT DOCUMENTS

| 5,120,195 A * | 6/1992 | Schmaling | B64C 27/35 384/221 |
| 2014/0377068 A1* | 12/2014 | Arnold | B64C 27/04 416/134 A |
| 2015/0050148 A1* | 2/2015 | Goette | B64C 27/605 416/148 |

FOREIGN PATENT DOCUMENTS

| DE | 100 01 378 A1 | 8/2000 |
| DE | 20 2007 001203 U1 | 7/2007 |

(Continued)

OTHER PUBLICATIONS

International Search Report issued Jul. 15, 2013 in International Application No. PCT/EP2013/051997 (2 pages).

(Continued)

*Primary Examiner* — Gregory Anderson
*Assistant Examiner* — Christopher R Legendre
(74) *Attorney, Agent, or Firm* — Brinks Gilson & Lione

(57) ABSTRACT

A rotor blade control device for a helicopter, comprising a swash-ring, said swash-ring comprising a non-rotating component of the swash-ring, coupled in a non-rotatable manner to the helicopter, a rotating component of the swash-ring, at least three actuators disposed around a rotor shaft axis of the helicopter, a coupling means between the actuators and the non-rotating component of the swash-ring. The coupling means can be adjusted in terms of its pitch, for changing the position of a swash-ring coupling point on the non-rotating component of the swash-ring along the rotor shaft axis by the actuator, by means of a control shaft, in order to adjust the rotor blades. The coupling means has a pushing member, in addition to at least one lever non-rotatably connected to the control shaft, which is connected at a first end to the lever in a rotational joint, such that it can pivot about a pivotal axis, and is coupled at a second end to the non-rotating (Continued)

Figure 1:
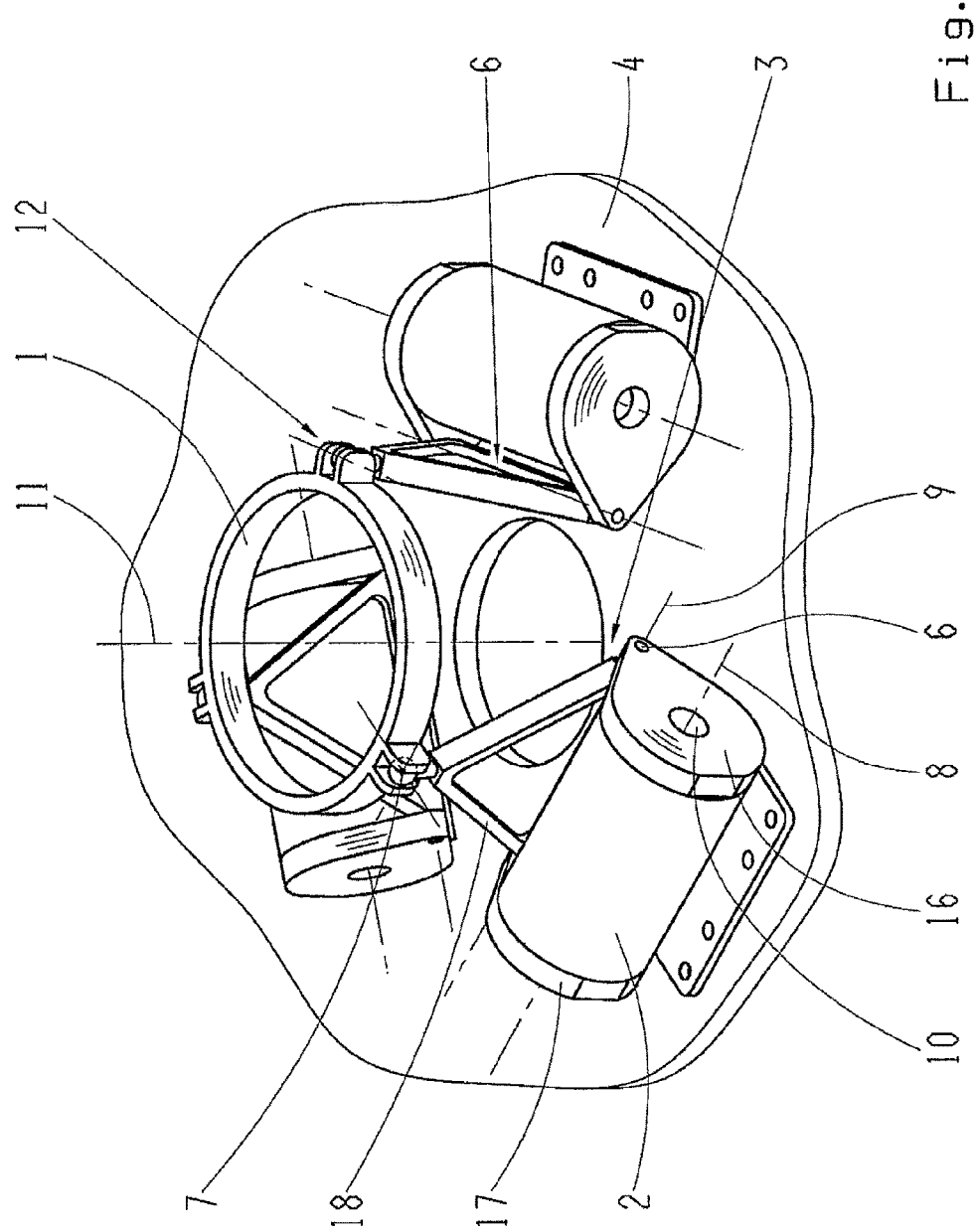

component of the swash-ring at a swash-ring coupling point, in a ball joint.

18 Claims, 2 Drawing Sheets

(56) References Cited

FOREIGN PATENT DOCUMENTS

| | | |
|---|---|---|
| DE | 10 2006 042 575 A1 | 3/2008 |
| EP | 2 155 553 B1 | 2/2010 |
| FR | 2 917 709 A1 | 12/2008 |
| JP | H 0740896 A | 2/1995 |
| JP | 2005289128 A * | 10/2005 |

OTHER PUBLICATIONS

International Search Report and Written Opinion from corresponding International Patent Application PCT/EP2013/051997, dated Jul. 15, 2013 (German Language) (9 pages).
Office Action dated Sep. 24, 2012 from corresponding DE 10 2012 203 978.3 (5 pages).

* cited by examiner

ROTOR BLADE CONTROL DEVICE

This application is a filing under 35 U.S.C. §371 of International Patent Application PCT/EP2013/051997, filed Feb. 1, 2013, and claims the priority of DE 10 2012 203 978.3, filed Mar. 14, 2012. These applications are incorporated by reference herein in their entirety.

The invention relates to a rotor blade control device for a helicopter.

In a helicopter, a rotor shaft drives a rotor head. The rotor head and rotor blades are rotatably disposed with regard to their longitudinal axis, and pivotally disposed regarding the angle between their longitudinal axis and the rotational axis of the rotor shaft. In order to control the flying movements of a helicopter, an adjustment of the rotational angle of the rotor blades about their longitudinal axes is necessary. This occurs by means of a swashplate, through which the rotor shaft passes, and which can be axially displaced and tilted with respect to the rotor shaft axis.

The annular swash plate, hereinafter referred to as a swash-ring, comprises an annular component, coupled in a rotatably fixed manner to the helicopter, hereinafter referred to as the non-rotating component of the swash-ring, and an annular component that is rotatably supported on their shared central axis, and non-rotatably coupled to the rotor shaft, hereinafter referred to as the rotating component of the swash-ring. The non-rotating component of the swash-ring is supported by means of a spherical bearing, for example, which enables a tilted position, and can be displaced parallel, or coaxially, respectively, to the rotor shaft axis.

The rotating component of the swash-ring is coupled in a rotatably fixed manner to the rotor shaft by means of an actuator rod, and thus revolves at the rotational speed of the rotor shaft. In order to adjust the rotor blades, actuators act on the non-rotating component of the swash-ring, and displace this along the rotor shaft axis, or, respectively, tilt this with respect to the rotor shaft axis, wherein these movements can also overlap, depending on the flight maneuver that is to be executed. These movements are transferred to the rotating component of the swash-ring by means of the rotatable bearing between the non-rotating component of the swash-ring and the rotating component of the swash-ring. These movements are converted to the desired movements of the rotor blades by means of the adjustment elements, such as control rods for example, between the rotating component of the swash-ring and the rotor blades.

The actuators are typically actuated hydraulically, but increasingly, electromechanical actuators are used, due to disadvantages with the hydraulic actuators, such as additional weight, the possibility of leakages, high maintenance costs, as well as fire danger and toxicity.

From EP 2155553 B1 a helicopter rotor blade control device is known, having a swash-ring comprising a non-rotating component of the swash-ring, i.e. an annular plate that does not rotate in relation to the helicopter, and a rotating component of the swash-ring. The rotating component of the swash-ring is disposed coaxially to the non-rotating component of the swash-ring that is connected in a rotatably fixed manner to the housing, or the helicopter, respectively, and rotates about a shared central axis for both components of the swash-ring. In addition, the rotating component of the swash-ring is axially and radially supported on the non-rotating component of the swash-ring.

The displacement, or tilting, respectively, of the non-rotating component of the swash-ring is generated thereby by three electromechanical actuators, which are functionally connected to three lateral, rod-type extensions of the non-rotating component of the swash-ring disposed evenly about the circumference of the annular non-rotating component of the swash-ring. The extensions are oriented radially outward, starting from the non-rotating component of the swash-ring. Each actuator has a lever that can pivot about a rotational axis of a control shaft for the actuator, which forms a sliding connection to the lateral extension of the non-rotating component of the swash-ring by means of a sliding component. The levers for the respective actuators can be pivoted over a specific adjustment angle, independently of one another, depending on the desired pitch or displacement of the non-rotating component of the swash-ring. Thus, for each pitch of the control shafts, or the levers, respectively, the connecting points allocated thereto assume a precisely defined point in space on the non-rotating component of the swash-ring. Thus, there is no need for a spherical bearing for guiding the non-rotating component of the swash-ring. A separate axial guide for the swash-ring can be omitted. Because the non-rotating component of the swash-ring is coupled to the helicopter by means of the lever, the sliding element, and the extension, elements that would prevent a rotating of the non-rotating component of the swash-ring together therewith are not necessary.

The rod-like lateral extensions extending radially outward from the non-rotating component of the swash-ring, and the actuators thus disposed radially outside it require, disadvantageously, a large radial structural space. The coupling means between the actuator and the non-rotating component of the swash-ring is constructed of two components, specifically the lever and the sliding element, in a complex manner. In addition, the sliding and articulated connections between the actuators and the extensions have high maintenance requirements, such as the lubrication, for example, of the sliding components and the monitoring of the lubrication status of the sliding surfaces. Furthermore, the tolerances at the sliding and articulated connections can increase, which would compromise the precision of the adjustment.

The fundamental object of the invention is to create, in a simple manner, a low-maintenance rotor blade control device having the smallest possible spatial requirements and a reduced variety of components.

This object is attained by means of the feature in claim 1.

A rotor blade control device for a helicopter has a swash-ring thereby, comprising an annular non-rotating component, an annular rotating component, at least three actuators disposed about a rotor shaft axis of the helicopter, and a coupling means between each actuator and the non-rotating component of the swash-ring. The actuators are connected in a fixed manner to a stationary component disposed in a fixed manner on the helicopter, wherein the actor has a control shaft that can be rotated by said actuator about a control axis. A stationary component is to be understood thereby as a component that is connected to the helicopter, or the structure of the helicopter, respectively, in a fixed manner. The rotating component of the swash-ring, disposed coaxially to the non-rotating component of the swash-ring, is rotatably supported on the non-rotating component of the swash-ring, which is connected thereto in a fixed manner due to its coupling with the actuator and thus the helicopter, and cannot rotate about the rotor shaft axis.

The coupling means is coupled at a point on the swash-ring to the non-rotating component of the swash-ring, such that the swash-ring coupling point is displaced at least along the rotor shaft axis via the coupling means as a result of the rotation of the control shaft. In addition, the coupling means comprises at least one lever, which is connected in a fixed manner to the control shaft. The control shafts for the respective actuators can rotate over a given adjustment angle independently of one another, depending on the desired pitch or displacement of the non-rotating component of the swash-ring, such that for each adjustment angle of the control shafts, the associated swash-ring coupling point assumes a precisely defined point in space.

According to the invention, the coupling means also has, in addition to the lever, a rigid pushing member, which is connected to the lever at one end in a rotational joint such that it can pivot about a pivotal axis. At a second end of the pushing member, it is coupled to the non-rotating component of the swash-ring at the coupling point of the swash-ring, by means of a ball joint, such that at the swash-ring coupling point, the non-rotating component of the swash-ring and the pushing member can be tilted in relation to one another in every direction. By this means, when the control shaft has been adjusted, a change in the radial spacing of the pivotal axis can be compensated for by means of the free mobility of the pushing member at the swash-ring coupling point.

Advantageously, the actuator and the non-rotating component of the swash-ring are coupled to one another by the two-part coupling means, the elements of which can pivot against one another about a rotational axis, and can pivot at a swash-ring coupling point in every direction in relation to the non-rotating component of the swash-ring. This has advantages regarding the number of components in the coupling means. In addition, because there are only two joints, which furthermore, only allow for pivotal movements, and no sliding movements, the maintenance expenditure, or wear, respectively, is low.

Advantageous designs of the invention can be derived from the dependent claims.

In a preferred design of the invention, the coupling means comprises an additional lever. The two levers, each of which is connected to the control shaft in a fixed manner at a first and a second end thereof, and form, together with the pushing member, the rotational joint. The pivotal axis is disposed parallel to the control axis. Advantageously, the two levers, together with the control shaft, form an element of the coupling means that does not rotate, which enables a symmetrical support for the pushing member, and thus enables greater transferrable forces, or, respectively, allows for a lower load to the joint bearing.

In the ball joint at the swash-ring coupling point it is also possible that, in addition to the tilting capacity, the pushing member and the non-rotating component of the swash-ring can be rotated against one another at the swash-ring coupling point.

In one advantageous design, the pushing member is designed as a triangular frame, on which the swash-ring coupling point is located at one corner, and the pivotal axis runs through its second and third corners. By this means, a stable support for the adjustment forces to the lever is enabled. In addition, the pushing member designed in this manner has a lower weight and smaller spatial requirements, which provide for a greater stiffness.

Furthermore, it is possible that the swash-ring coupling point and the pivotal axis are axially spaced apart from one another with respect to the rotor shaft axis.

Another design provides that the actuators and the coupling means are disposed radially to the rotor shaft axis, outside of the non-rotating component of the swash-ring.

Alternatively, it is also possible that the actuators are disposed within the non-rotating component of the swash-ring. By this means, the spatial requirements in the radial direction, starting from the rotor shaft axis, are advantageously small.

Lastly, it has been determined to be advantageous that the pivotal axis runs perpendicular to the rotor shaft axis, and is spaced apart therefrom, wherein at a given adjustment angle of the pair of levers, the pivotal axis has the same radial spacing to the rotor shaft axis as the swash-ring coupling point, when viewed, starting radially from rotor shaft axis, in the direction of the swash-ring coupling point.

As a result, the pushing member lies substantially parallel to the rotor shaft axis, by means of which the actuators can advantageously move closer to a point where they are adjacent to the rotor shaft axis in the radial direction with respect to said rotor shaft axis.

Furthermore, it may be provided that the radial spacing of the control axis 8 to the rotor shaft axis is greater than the spacing of the pivotal axis to the rotor shaft axis.

In one design of the invention, the actuators are designed as electromotors.

Alternatively, the actuators can be designed as hydraulic pivotal motors.

Preferably, the actuators have an internal redundancy, by means of which the operational reliability is increased.

Advantageously, it is possible that a helicopter has a rotor blade control device according to one of the possible designs.

An embodiment example of the invention is depicted in the drawings, and shall be described below in greater detail.

Figure 2:
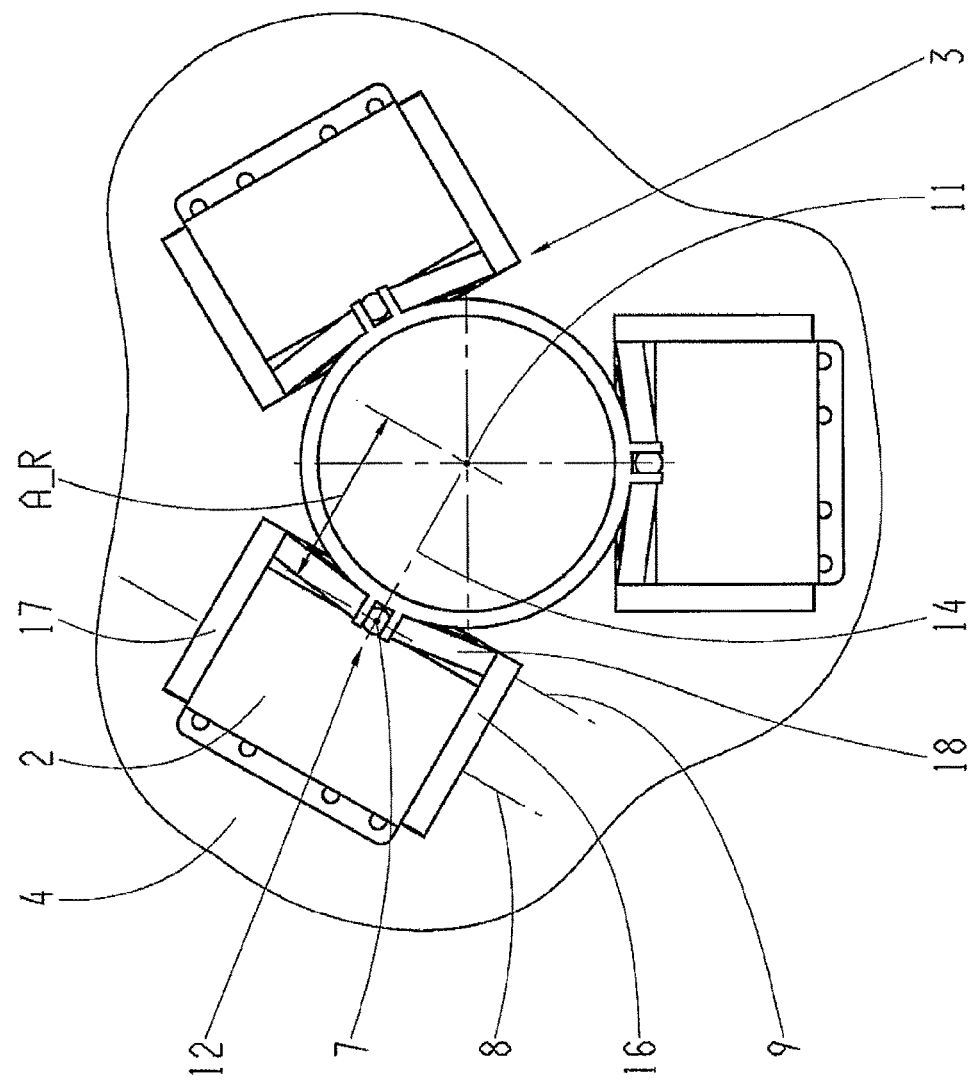

Shown are:

FIG. 1 a perspective view of the rotor blade control device according to the invention, and FIG. 2 a top view of the rotor blade control device according to the invention.

FIG. 1 shows a simplified perspective depiction of a rotor blade control device according to the invention, in the installation position. The rotor blade control device comprises a swash-ring and an actuating mechanism for its adjustment. Of the one rotating component and the one non-rotating component comprised in the swash-ring, only the non-rotating component of the swash-ring 1 is depicted, on which the rotating component of the swash-ring is supported such that it can rotate about the shared central axis. Not belonging to the rotor blade control device is a stationary component 4, which is to be understood to be, for example, a component of the overall system for the helicopter, which is stationary in relation to the structure of helicopter, or is connected thereto in a fixed manner, respectively. A rotor shaft, not shown, is disposed in a central passage of the stationary component 4, which rotates, driven by a drive motor, not shown, about a rotor shaft axis 11. The rotor shaft axis 11 runs, when in the installation position, or in a standing helicopter, substantially vertical. Three actuators 2, for tilting the non-rotating component of the swash-ring 1 in relation to the rotor shaft axis 11, or for displacing the non-rotating component of the swash-ring 1 along the rotor shaft axis 1, or, respectively, for an overlapping of both movements, are disposed in a fixed manner on the stationary component 4. The three actuators 2 are distributed thereby, in an advantageous design, at uniform spacings about the rotor shaft axis 11. In order to transfer the movement of the actuators 2 to the non-rotating component of the swash-ring 1, one coupling means 3 is provided for each actuator, which is disposed between the respective actuator 2 and the non-rotating component of the swash-ring 1.

The three actuators 2, and the associated coupling means 3, are identical. For this reason, hereinafter, identical components of the three different assemblies shall be indicated with the same reference symbols. In the following example, the actuators 2 are designed as electromechanical actuators, having electromagnetically rotatable control shafts 10 surrounding a control axis 8. The electromechanical actuators can be designed as electrical servo motors having a transmission for reducing the servo motor rotation speed to the movement of the control shaft, with which it is possible to rotate the control shaft 10 about an adjustment angle. Alternatively to this, hydraulic actuators, such as hydraulic pivot motors, could also be used.

Each coupling means 3 comprises two levers 16 and 17 and a pushing member 18. The control shafts 10 extend at both ends from the actuator 2. The levers 16 and 17 are each connected in a fixed manner to the control shaft 10 at one of the two ends thereof, and rectified, i.e. not rotated in relation to one another relative to the control axis 8, such that they form a pair of levers. The pushing member 18 is designed as a triangular frame in the embodiment example. The ends of the levers 16 and 17 and two corners of the pushing member 18 form a pivot joint 6, the rotational axis of which is a pivotal axis 9. The pivotal axis 9 runs parallel to the control axis 8. The pushing member 18 is coupled to a third corner at the swash-ring coupling point 7 with the non-rotating component of the swash-ring 1 such that the non-rotating component of the swash-ring 1 and the pushing member 18 can tilt relative to one another in every direction. Thus, the pushing member 18 and the non-rotating component of the swash-ring 1 form a ball joint 12 at the swash-ring coupling point 7.

With a control shaft 10 extending on one side from the actuator 2, the functions of the rotor blade control device can also be implemented with only one lever, wherein, however, the load to the components is increased as a result of an asymmetrical application of force in the actuators. Furthermore, the pivot joint would have a significantly smaller width than with a design having two levers, by means of which the load to the pivot joint, and thus the component load, increases.

The three actuators 2 with the associated coupling means 3 are disposed at equal spacings around the non-rotating component of the swash-ring 1, and connected in a fixed manner to the stationary component 4. In the radial direction, starting from the rotor shaft axis 11, the actuators 2 are disposed outside of the non-rotating component of the swash-ring 1.

The swash-ring coupling point 7 and the pivotal axis 9 are axially spaced apart from one another with respect to the rotor shaft axis 11. The pivotal axis 9 is radially spaced apart from the rotor shaft axis 11. In a projection plane, in which the rotor shaft axis 11 lies, and which runs parallel to the pivotal axis 9 in question, the rotor shaft axis 11 and the pivotal axis 9 meet at a right angle. The radial spacing of the control axis 8 from the rotor shaft axis 11 is greater than that of the pivotal axis 9 from the rotor shaft axis 8.

With a rotation of the control shaft 10, the levers 16 and 17 are rotated about the control axis 8, such that a radial spacing A_R of the pivotal axis 9 running through the levers 16 and 17 to the rotor shaft axis 11 changes. At a given adjustment angle of the control shaft 10 the shortest radial spacing A_R of the pivotal axis to the rotor shaft axis 11 is as large as the radial spacing of the swash-ring coupling point 7 to the rotor shaft axis 11, as can be derived from the depiction in FIG. 2. A spacing line 14 for the shortest radial spacing of the pivotal axis 9 to the rotor shaft axis 11 runs through the swash-ring coupling point 7. This means that with a given adjustment angle of the levers 16 and 17, the pivotal axis 9 has the same radial spacing A_R to the rotor shaft axis 11, seen radially from the shaft axis 11 in the direction of the swash-ring coupling point 7, as the swash-ring coupling point 7.

Because the levers 16 and 17 in the embodiment example can only be moved in a range for an adjustment angle of less than 180°, the radial positions, in relation to the rotor shaft axis 11, deviate from the pivotal axis 9 and swash-ring coupling point 7, depending on the adjustment angle of the control shaft 10, less than the spacing between the control axis 8 and the pivotal axis 9, running parallel to one another.

The pushing member 18 thus has, in the depicted example, a substantially perpendicular, downward, or an imaginary, respectively, connecting line between the swash-ring coupling point 7 and the pivotal axis 9, which intersects with the pivotal axis 9 at a right angle, running substantially parallel to the rotor shaft axis 11, when the rotor blade control device is in the installation position. By this means, a configuration of the actuators 2 is possible, which advantageously requires a smallest possible radial assembly space in relation to the rotor shaft axis 11.

If now, all three actuators 2 are configured such that all control shafts 10, or the levers 16 and 17 disposed thereon, are in the same position, as shown in FIG. 1 and FIG. 2, the non-rotating component of the swash-ring 1 is oriented such that it is concentric to the rotor shaft axis 11. If all rotor blades are rotated about their longitudinal axis at the same adjustment angle, then the control axes 10 of all three actuators are rotated at the same angle. As a result, the non-rotating component of the swash-ring 1 is pushed along the rotor shaft axis 11, wherein it remains concentric to the rotor shaft axis 11 regarding its position and orientation.

If the rotational angle of a rotor blade changes during a rotation of the rotor shaft axis, the non-rotating component of the swash-ring must be tilted at an angle to the rotor shaft axis such that central axis of the non-rotating component of the swash-ring, or the rotational axis of the, not shown, rotating component of the swash-ring, respectively, and the rotor shaft axis 11 are no longer concentric.

In order to obtain a tilting of the non-rotating component of the swash-ring 1, at least one of the three control shafts 10, or the levers 16 and 17, fixed in a non-rotating manner thereon, respectively, must assume a different position than the levers of the other actuators. As a result, the swash-ring coupling point 7 is pushed, by means of the rotational joint 6 of the pushing member 18, along the rotor shaft axis 11, wherein the pushing member 18 pivots about the pivotal axis 9, and also changes its angle to the non-rotating component of the swash-ring 1 at the swash-ring coupling point 7. This movement of the one swash-ring coupling point 7 would only be possible by means of a joint acting on only one rotational axis at the swash-ring coupling point 7, but, however, the tilting of the non-rotating component of the swash-ring 1 would then generate a bending torque at the coupling means for the two other actuators, and thus lead to a tensioning, or jamming of the assembly. By means of the degrees of freedom of the ball joint 12 at the swash-ring coupling point 7, which enables a pivoting of the pushing member 18 and the non-rotating component of the swash-ring 1 in relation to one another in any arbitrary direction, an arbitrary tilting, however, of the non-rotating component of the swash-ring 1 in relation to the rotor shaft axis 11, is possible.

The displacement of the non-rotating component of the swash-ring 1, in the coaxial position in relation to the rotor shaft axis 11, in its longitudinal direction, and the tilting of the non-rotating component of the swash-ring 1 in relation to the rotor shaft axis 11, can be overlapping. For this, the control shafts 10 of all actuators 2 can be adjusted independently of one another. Despite the degrees of freedom for the control shafts 10, the rotational joint 6 and the swash-ring coupling point 7, or the ball joints 12, respectively, due to the coupling of the three actuators 2 via the associated coupling means 3 and the non-rotating component of the swash-ring 1, the position of the swash-ring coupling point 7 in space is clearly defined for each rotational angle of the control shafts 10.

REFERENCE SYMBOLS 1 non-rotating component of the swash-ring
2 actuator
3 coupling means
4 stationary component
6 rotational joint
7 swash-ring coupling point
8 control axis
9 pivotal axis
10 control shaft
11 rotor shaft axis
12 ball joint
14 spacing line
16 lever
17 lever
18 pushing member
A_R radial spacing of the pivotal axis to the rotor shaft axis

The invention claimed is:

1. A helicopter comprising a rotor blade control device comprising:
a swash-ring including a non-rotating component and a rotating component;
at least three actuators disposed around a rotor shaft axis of the helicopter and attached to a stationary component fixed to the helicopter; and
at least three coupling means, each of the at least three coupling means for connecting one of the at least three actuators to the non-rotating component;
wherein each of the at least three actuators comprises a control shaft capable of rotating about a control axis;
wherein each of the at least three coupling means comprises a first lever and a second lever, the first and second levers connected in a fixed manner to one of the control shafts at a first end and a second end of the respective control shaft, respectively;
wherein each of the at least three coupling means is coupled to the non-rotating component at a swash-ring coupling point;
wherein each control shaft is capable of rotating about an adjustment angle independently of the other control shafts;
wherein each of the at least three coupling means further comprises a pushing member including a first end and a second end, each pushing member connected to the corresponding first and second levers of the respective coupling means at the first end of the respective pushing member;
wherein each pushing member is capable of pivoting in a rotational joint about a pivotal axis;
wherein the first and second levers of each respective coupling means form, together with the respective pushing member, the respective rotational joint;
wherein the respective pivotal axis is disposed parallel to the respective control axis; and
wherein each pushing member is coupled at the second end to the non-rotating component via a ball joint at the corresponding swash-ring coupling point, such that the corresponding swash-ring coupling point is capable of being pushed along the rotor shaft axis by the respective rotational joint and such that at the corresponding swash-ring coupling point, the non-rotating component and each pushing member are capable of tilting relative to one another in any direction.

2. The helicopter according to claim 1, wherein each pushing member comprises a triangular frame, and wherein the corresponding swash-ring coupling point is located at a first corner of the respective triangular frame, and the pivotal axis runs along a second and third corner of the respective triangular frame.

3. The helicopter according to claim 1, wherein each swash-ring coupling point is spaced axially apart from the corresponding pivotal axis with respect to the rotor shaft axis.

4. The helicopter according to claim 3, wherein each pivotal axis is perpendicular to the rotor shaft axis and each pivotal axis is spaced apart from the rotor shaft axis at an offset distance, wherein, at the corresponding adjustment angle, the corresponding swash-ring coupling point is spaced apart from the rotor shaft axis at the offset distance.

5. The helicopter according to claim 1, wherein the at least three actuators and the at least three coupling means are distributed radially around the rotor shaft axis and outside a perimeter formed by the non-rotating component in an axis perpendicular to the rotor shaft axis.

6. The helicopter according to claim 1, wherein a first radial distance between the respective control axis of one of the at least three actuators and the rotor shaft axis is greater than a second radial distance between the respective pivotal axis and the rotor shaft axis.

7. The helicopter according to claim 1, wherein each of the at least three actuators comprises an electromotor.

8. The helicopter according to claim 1, wherein each of the at least three actuators comprises an hydraulic pivot motor.

9. The helicopter according to claim 1, wherein each of the at least three actuators comprises an actuator with internal redundancy.

10. A rotor blade control device for a helicopter, the rotor blade control device comprising
a swash-ring including a non-rotating component and a rotating component;
at least three actuators disposed around a rotor shaft axis of the helicopter and attached to a stationary component fixed to the helicopter; and
at least three coupling means, each of the at least three coupling means for connecting one of the at least three actuators to the non-rotating component;
wherein each of the at least three actuators comprises a control shaft capable of rotating about a control axis;
wherein each of the at least three coupling means comprises a first lever and a second lever, the first and second levers connected in a fixed manner to one of the control shafts at a first end and a second end of the respective control shaft, respectively;
wherein each of the at least three coupling means is coupled to the non-rotating component at a swash-ring coupling point;
wherein each control shaft is capable of rotating about an adjustment angle independently of the other control shafts;

wherein each of the at least three coupling means further comprises a pushing member including a first end and a second end, each pushing member connected to the corresponding first and second levers of the respective coupling means at the first end of the respective pushing member;

wherein each pushing member is capable of pivoting in a rotational joint about a pivotal axis;

wherein the first and second levers of each respective coupling means form, together with the respective pushing member, the respective rotational joint;

wherein the respective pivotal axis is disposed parallel to the respective control axis; and wherein each pushing member is coupled at the second end to the non-rotating component via a ball joint at the corresponding swash-ring coupling point, such that the corresponding swash-ring coupling point is capable of being pushed along the rotor shaft axis by the respective rotational joint and such that at the corresponding swash-ring coupling point, the non-rotating component and each pushing member are capable of tilting relative to one another in any direction.

11. The rotor blade control device according to claim 10, wherein each pushing member comprises a triangular frame, and wherein the corresponding swash-ring coupling point is located at a first corner of the respective triangular frame, and the respective pivotal axis runs along a second and third corner of the respective triangular frame.

12. The rotor blade control device according to claim 10, wherein each swash-ring coupling point is spaced axially apart from the corresponding pivotal axis with respect to the rotor shaft axis.

13. The rotor blade control device according to claim 12, wherein each pivotal axis is perpendicular to the rotor shaft axis and each pivotal axis is spaced apart from the rotor shaft axis at an offset distance, wherein, at the corresponding adjustment angle, the corresponding swash-ring coupling point is spaced apart from the rotor shaft axis at the offset distance.

14. The rotor blade control device according to claim 10, wherein the at least three actuators and the at least three coupling means are distributed radially around the rotor shaft axis and outside a perimeter formed by the non-rotating component in an axis perpendicular to the rotor shaft axis.

15. The rotor blade control device according to claim 10, wherein a first radial distance between the respective control axis of one of the at least three actuators and the rotor shaft axis is greater than a second radial distance between the respective pivotal axis and the rotor shaft axis.

16. The rotor blade control device according to claim 10, wherein each of the at least three actuators comprises an electromotor.

17. The rotor blade control device according to claim 10, wherein each of the at least three actuators comprises a hydraulic pivot motor.

18. The rotor blade control device according to claim 10, wherein each of the at least three actuators comprises an actuator with internal redundancy.

* * * * *